May 23, 1939.  A. C. LINDGREN  2,159,663
GRAIN SCREEN FOR FEEDERS
Filed Nov. 2, 1936
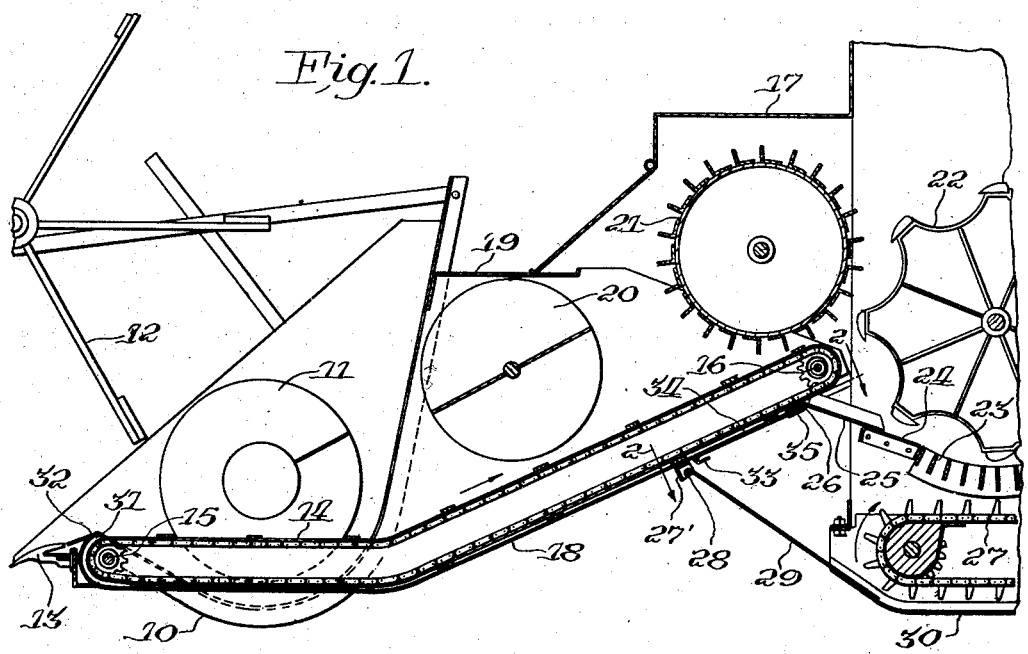
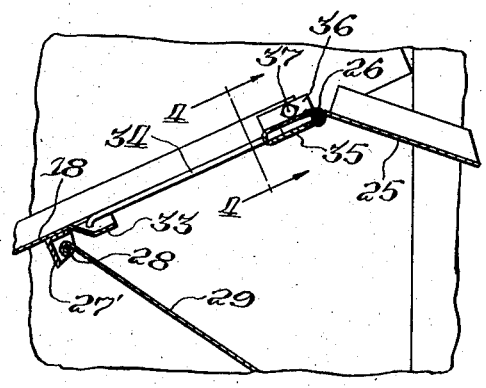
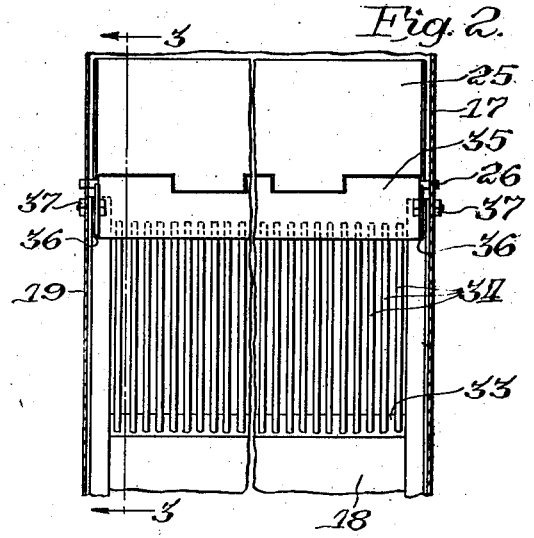
Inventor
Alexus C. Lindgren
By /. /. Sprague
Atty.

Patented May 23, 1939

2,159,663

UNITED STATES PATENT OFFICE 2,159,663

GRAIN SCREEN FOR FEEDERS

Alexus C. Lindgren, Chicago, Ill., assignor to International Harvester Company, a corporation of New Jersey Application November 2, 1936, Serial No. 108,719

2 Claims. (Cl. 130—27)

The invention relates to grain screening means which may be used in connection with feeders for handling grain in such machinery as, for example, harvester threshers.

These harvester threshers usually embody a transverse harvester platform including a transverse conveyer for moving cut grain in a stubbleward direction and to transfer it onto the front end of a right-angularly disposed, longitudinal conveyer, which then moves the cut grain rearwardly and upwardly to the thresher part of the machine.

These feeder conveyers are of the endless type with the bottom stretch thereof being dragged forwardly over a tight bottom and the upper stretch of conveyer moving rearwardly to carry the cut crop to the thresher. In the process of harvesting and conveying the grain by means of the platform and feeder conveyers, it frequently occurs that more or less grain is shelled from the straw, and it so happens at times that this shelled grain is returned to the front end of the feeder by the bottom stretch of the conveyer. The feeder then moves such raw grain back into the cylinder, which is objectionable, as it causes breaking and damaging of such grain. There is no need to rethresh such shelled grain since it has already been threshed. It is desirable, therefore, to provide means at the discharge end of the feeder conveyer to permit any shelled grain having a tendency to be moved forwardly by the lower run of the conveyer to be trapped or screened to prevent such forward movement of the grain, and consequently its return to the cylinder for further threshing, which in any event is unnecessary. It is further desirable that such shelled grain, before it can be reversely moved, be permitted to drop by gravity through a grate or like screen means at the upper end of the tight bottom over which the lower run of the feeder conveyer returns, so that such grain may fall down an inclined chute, or the like, and thus be moved where it will with certainty be handled by a grain carrier conveyer and be transferred rearwardly into the separator of the thresher part of the machine below the cylinder to a point in back thereof in the celaning mechanism.

It is the main object of this invention to provide a simple means for preventing shelled grain handled by the feeder for the harvester thresher, or the like, from being rethreshed by the cylinder.

Another object is to provide a simple grate or screen structure, or the like, disposed in the tight bottom underneath the feeder at its discharge end to catch the raw shelled grain and cause it to move by gravity to a point where a grain carrier will be sure to pick it up and move it rearwardly into the grain separator.

Other objects will be apparent to those versed in this art as the disclosure is more fully made.

In the accompanying sheet of drawings, there is illustrated one practicable example which the invention may assume in practice, and in the drawing:

Figure 1 is a longitudinal, cross sectional view through the feeder of a harvester thresher back to the thresher cylinder thereof, the view being from the stubbleward side of the machine;

Figure 2 is a cross sectional view of the grain screening grate structure and related parts, taken along the line 2—2 of Figure 1, looking in the direction indicated by the arrows;

Figure 3 is a longitudinal cross sectional view through the grate structure and related parts, taken along the line 3—3 of Figure 2, looking in the direction of the arrows; and, Figure 4 is a transverse, cross-sectional view through a portion of the grain screening grate, taken along the line 4—4 of Figure 3, looking in the direction of the arrows.

For the sake of illustration, a harvester thresher is shown in Figure 1 of the drawing, and in this view it will be noted that the same comprises the usual transverse platform trough 10, in which is operable a transverse auger conveyer 11, which receives the grain paddled to it by a conventional reel 12 from the conventional cutting apparatus 13. At the stubbleward side of the platform trough 10 and also behind the cutting apparatus 13, is a rearwardly extending endless feeder conveyer 14 which, at its front end, is substantially horizontally disposed to receive the grain from the cutting apparatus and from the conveyer 11. The rear portion of said longitudinal feeder conveyer portion is upwardly and rearwardly inclined, as shown in Figure 1, the entire conveyer structure being trained around a pair of shafts 15 and 16 with the shaft 16 comprising a transverse pivot shaft carried in the body 17 of the thresher part of the harvester thresher. The feeder 14 is operable over a tight bottom 18 forming part of a feeder house 19, which is pivotally mounted for up and down movement about the axis of the shaft 16 in a manner well understood in this art, whereby the height of the cutting apparatus 13 with respect to the ground may be regulated.

The housing 19 carries a rotatable beater 20 over the forward end of the rearwardly and upwardly inclined part of the feeder conveyer 14, and at its discharge end the feeder has disposed thereabove in the housing 17 a feed regulating drum 21, so that grain passed upwardly between the drum 21 and the top run of the feeder conveyer 14 will be moved in an even stream to a thresher cylinder 22 herein disclosed as being of the rub-bar type, said cylinder being carried in the housing 17 of the thresher part. Below the cylinder 22 is the usual concave 23 and in advance of the concave 23 is a feeder plate 24, the same being inclined so that material being discharged from the upper end of the feeder 14 will lodge on a rearwardly and downwardly inclined chute 25, which is carried for up and down pivotal movement about the axis of a transverse shaft 26 carried in the housing 17, said member 25 at its discharge end resting on the inclined member 24, as shown in Figure 1.

Beneath the concave 23 is an endless grain carrier 27 for receiving grain threshed between the cylinder 22 and concave 23 and moving it rearwardly back into the usual separator mechanism, not shown. Adjacent the upper end of the feeder, the tight bottom 18 carries a transverse angle bar 27' provided with a hinge pin 28 for pivotally carrying a rearwardly and downwardly inclined chute plate 29, the lower end of which rests, as shown in Figure 1, in the bottom 30 for the housing 17.

In the operation of feeders of this type, the grain is carried on the top run of the feeder 14, as indicated by the arrow in Figure 1. It so happens that raw shelled grain sometimes is returned by the bottom run of the conveyer 14 downwardly and forwardly over the tight bottom 18 to a point at the front end of the feeder conveyer 14 behind the cutting apparatus 13, in a space 31 between a front shield 32 and the front end of the conveyer 14, as shown in Figure 1. From this space 31 the feeder conveyer picks up such shelled grain and feeds it back into the cylinder for rethreshing, which is unnecessary since such grain is already threshed and further subjection thereof to the action of the cylinder can only damage it.

It is desirable that such damage to grain already threshed be prevented and that the said shelled raw grain be moved into the separator for cleaning, and, accordingly, in the structure of the present invention the tight bottom 18 underneath the feeder conveyer 14 terminates at a point just behind the angle bar 27', as shown in Figure 3, the same being bent downwardly and forwardly, as at 33, to provide a pocket into which the front ends of a series of parallel, longitudinal grate bars 34 are disposed, the rear ends of said grate bars being carried in a suitable mounting member 35. This mounting member has its opposite ends 36 turned up, so that bolts 37 may be passed therethrough securely to mount the plate 35 in the body structure. These grate members 34 are longitudinally disposed and spaced apart transversely to provide screen openings, through which shelled grain may drop by gravity through the grate and downwardly onto the inclined chute plate 29, which serves by gravity to cause the grain to accumulate at a point in advance of the front end of the grain carrier 27, shown in Figure 1, where the bars on the carrier serve to pick up the grain and move it upwardly and rearwardly back to the separator, not shown, for cleaning, and without subjecting it to further threshing action of the cylinder.

This completes the detailed description of the parts and it will be seen that, by means of the simple expedient of providing a grate structure, or the like, in the tight bottom 18 of the feeder housing below the discharge end of the feeder conveyer 14, shelled grain cannot be returned to the threshing cylinder for rethreshing. Instead, all such shelled grain must fall through the grate or screen structure 34 where the grain carrier 27 will receive it and move it into the separator. It will be seen that this grain screening structure is very desirable and achieves the objects of the invention heretofore recited.

It is the intention to cover all changes and modifications which do not depart from the spirit and scope of the invention which is defined in the appended claims.

What is claimed is:

1. A feeder for the thresher cylinder of a harvester thresher having a body adapted to receive the loose crop material as it is cut, said feeder comprising a longitudinal feeder house structure inclined upwardly and rearwardly from the receiving end to the thresher housing at a point in close proximity to the thresher cylinder, a transverse shaft extending across the feeder house and carried by the thresher body and serving pivotally to carry the rear end of the feeder house on the thresher body, a second shaft disposed parallel to the first shaft and carried by the feeder house at its receiving end, said feeder house including a tight bottom extending below the shafts from the receiving end rearwardly toward the thresher housing, said bottom being provided at its upper end with a grate structure forming a continuation thereof, an imperforate endless apron conveyer trained about the aforesaid shafts and having its lower run dragging forwardly over the grate structure and tight bottom, and means disposed below the grate structure for receiving grain therefrom and directing it below the thresher cylinder, said grate preventing grain from being dragged forwardly over the bottom.

2. A feeder for the thresher cylinder of a harvester thresher having a body adapted to receive the loose crop material as it is cut, said feeder comprising a longitudinal feeder house structure inclined upwardly and rearwardly from the receiving end to the thresher housing at a point in close proximity to the thresher cylinder, a transverse shaft extending across the feeder house and carried by the thresher body and serving pivotally to carry the rear end of the feeder house on the thresher body, a second shaft disposed parallel to the first shaft and carried by the feeder house at its receiving end, said feeder house including a tight bottom extending below the shafts from the receiving end rearwardly toward the thresher housing, said bottom being provided at its upper end with a grate structure forming a continuation thereof, an imperforate endless apron conveyer trained about the aforesaid shafts and having its lower run dragging forwardly over the grate structure and tight bottom, a curved shield embracing the front end of the apron conveyer, said shield forming substantially a continuation of the tight bottom, the conveyer dragging upwardly in said shield to retrieve grain dropping downwardly thereinto, and means disposed below the grate structure for receiving grain therefrom and directing it below the thresher cylinder, said grate preventing grain from being dragged forwardly over the bottom.

ALEXUS C. LINDGREN.